April 26, 1927.    1,626,283
J. A. JENSEN
EMERGENCY VALVE CONTROL SYSTEM FOR TANK VEHICLES
Filed Aug. 29, 1924    4 Sheets-Sheet 1
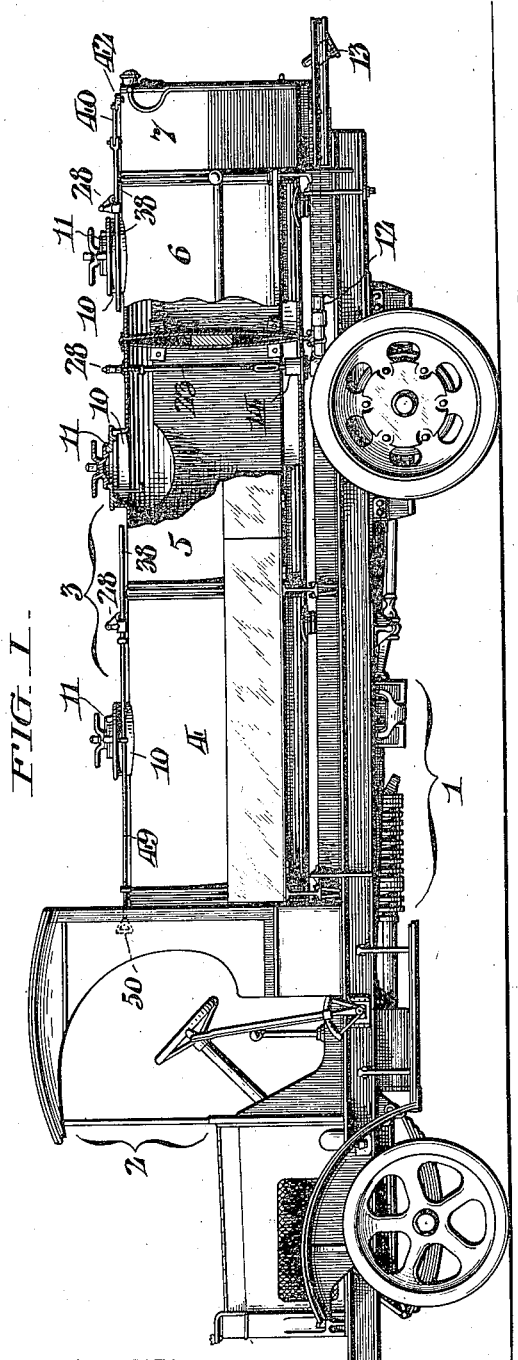
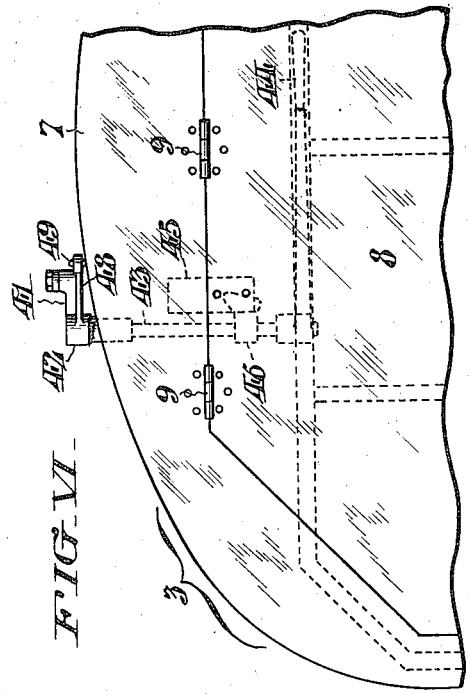
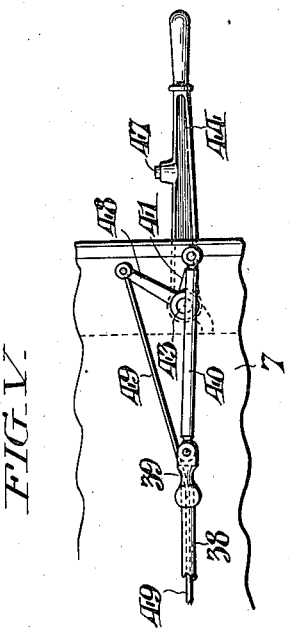
WITNESSES
INVENTOR:
James A. Jensen,
BY
ATTORNEYS.

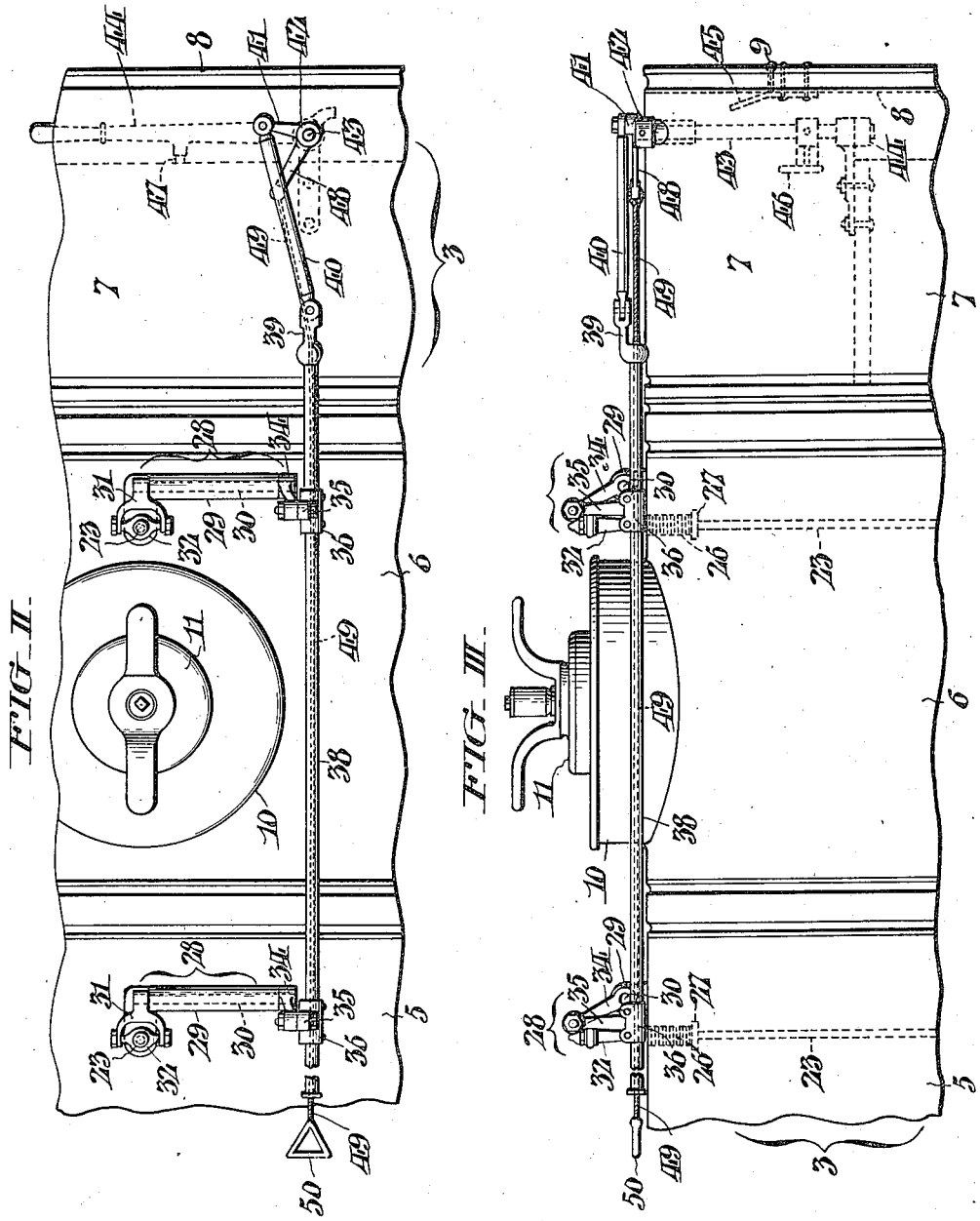

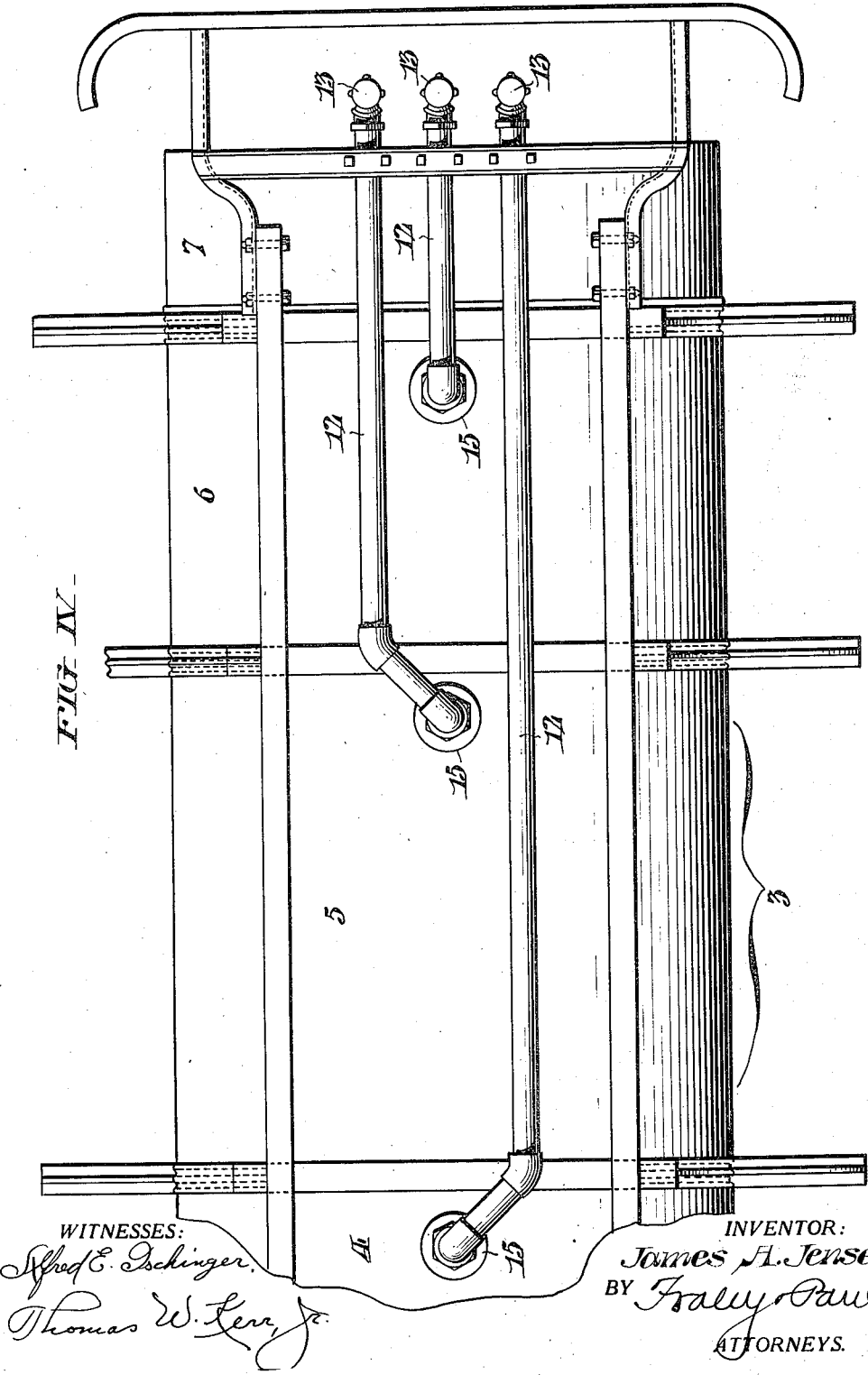

April 26, 1927.
J. A. JENSEN
EMERGENCY VALVE CONTROL SYSTEM FOR TANK VEHICLES
Filed Aug. 29, 1924   4 Sheets-Sheet 4
1,626,283
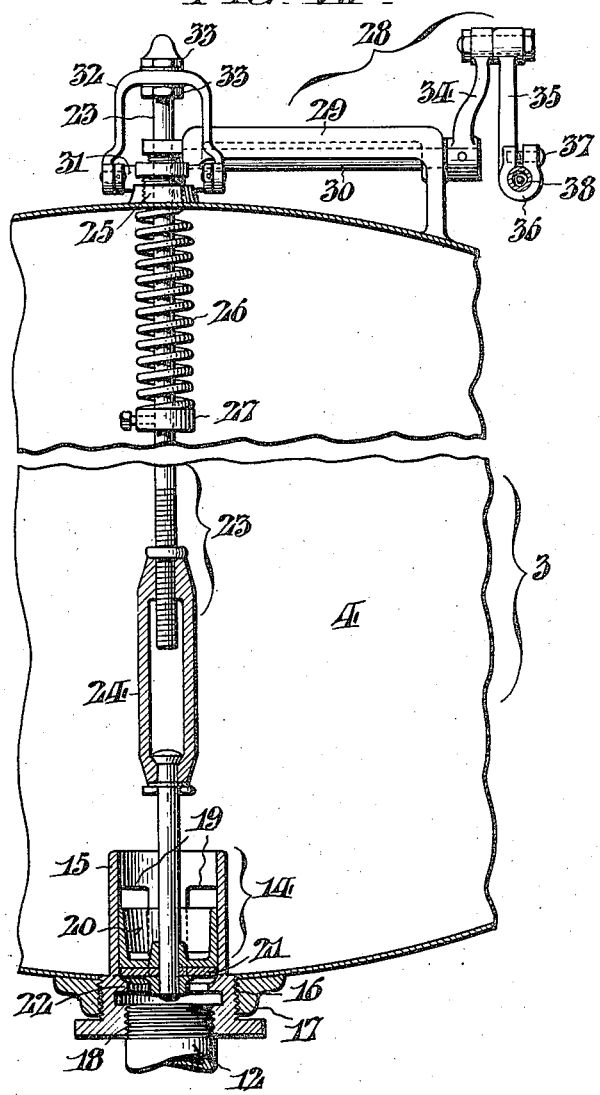
FIG. VII
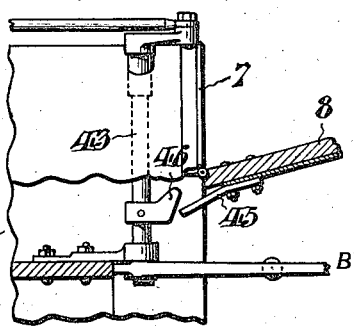
FIG. VIII
WITNESSES:
INVENTOR:
James A. Jensen,
BY
ATTORNEYS.

Patented Apr. 26, 1927.

1,626,283

UNITED STATES PATENT OFFICE.

JAMES A. JENSEN, OF PHILADELPHIA, PENNSYLVANIA, ASSIGNOR TO QUAKER CITY IRON WORKS, OF PHILADELPHIA, PENNSYLVANIA, A CORPORATION OF PENNSYLVANIA.

EMERGENCY-VALVE-CONTROL SYSTEM FOR TANK VEHICLES.

Application filed August 29, 1924. Serial No. 734,860.

This invention relates to systems for controlling emergency valves of tank vehicles of the type employed in transporting liquid commodities such as fuel, oil and the like. In order that several different kinds of the liquid commodities may be carried at one time, the tanks of such vehicles are either subdivided internally, or made as composite structures involving a number of separate units. With the several subdivisions or units are individually associated emergency valves which are kept closed during travel of the vehicle for security of the contents against loss, as well as for safety in general from the standpoint of fire hazard.

The main object had in view in the present connection is to enable, in systems of the character mentioned, control of the emergency valves from either end of the vehicle,—that is to say, from the rear so that said valves may be conveniently opened and closed at the time the service faucets are used in dispensing the liquids, and shut off from the front of the vehicle at a point convenient to the driver's seat, in case of a fire starting at the rear when drawing oil or gasoline.

Other objects and attendant advantages will become apparent from the description hereinafter of a typical embodiment of the invention, the appended claims serving to define those features which I believe to be entirely new and novel.

With reference to the drawings, Fig. I is an illustration of a tank vehicle embodying my improved emergency valve control system, portions of the organization being shown in section to set forth certain important details to better advantage.

Fig. II is a fragmentary detail plan view of the tank structure.

Fig. III is a corresponding side elevation of the portion of the tank structure shown in Fig. II.

Fig. IV is an inverted plan view of the preceding.

Fig. V is a fragmentary detail plan view of the tank structure showing the means whereby the emergency valves are controlled from the rear end of the vehicle.

Fig. VI is a partial rear end elevation of the tank structure.

Fig. VII is a cross sectional view through one of the subdivisions or component units of the tank structure showing its emergency valve and the associate operating connections; and Fig. VIII is a fragmentary part sectional view of the rear end of the tank structure.

The tank vehicle shown complete in Fig. I will be recognized as of standard construction generally, and comprising a typical chassis 1 with the usual protective housing 2 over the driver's seat. Mounted upon the chassis 1 to the rear of the driver's housing 2, is a tank structure 3 composed of a series of separate axially-aligned subdivisions or units 4—5—6 that are secured to one another and lashed to the chassis 1 in accordance with conventional practice. Appended to the rearmost unit 6,—and therefore forming a part of the tank structure 3,—is a compartment 7 which is utilized for storage of accessories such as measuring vessels, funnels, etc., necessary in dispensing the liquid commodities. As shown in Fig. VI, said compartment 7 is accessible through a door 8 swingable upward about suspension hinges indicated at 9. The tank units 4—5—6 are filled through individual inlets 10 with removable closure members or covers 11, and drained through separate line pipes or conduits 12 that lead to the rear of the vehicle where they are equipped with service faucets or cocks 13, see Figs. I and IV. In addition, the tank units 4—5—6 are equipped with emergency valves 14 the details of one of these being illustrated in Fig. VII of the drawings. As shown, this emergency valve 14 comprises a cylindrical tubular fitting 15 which is externally threaded as at 16 to engage within an annular flange 17 about the outlet opening in the bottom of the corresponding tank unit, and also internally threaded as at 18 for connection of the drain pipe or conduit 12. The inwardly extending portion of the fitting 15 has flow ports 19 through its cylindric wall, adapted to be controlled by a piston 20 which is slidably guided within the bore of the fitting 15. When the piston 20 is in the lowered or closed position illustrated, a resilient washer or gasket 21 on its bottom forms a fluid-tight seal with an annular seat 22 internally of the cylindric fitting 15. A stem 23 adjustable lengthwise through interposition therein of a turn-buckle 24, extends upwardly from the piston 20 and through a stuffing box 25 in the top of the tank unit, to the exterior to enable connection of the control means which will be presently explained. A helical spring 26 exerts downward pressure upon a collar 27 on the stem 23 and thereby serves to maintain the piston 20 yieldingly in contact with the valve seat 22, and the emergency valve 14 normally closed.

The general construction, arrangement and equipment of a typical standard tank vehicle organization being now thoroughly understood, I will proceed with the description of the emergency valve control system with which this invention is more particularly concerned. Mounted upon the top of each of the tank units 4—5—6, is an actuator comprehensively indicated by the numeral 28, and shown as including a laterally disposed bracket 29 with journals for rotatively supporting a rock shaft 30. At one end, this shaft 30 terminates directly adjacent to the upper protruding portion of the valve stem 23 and has there affixed to it, a bifurcated lever 31 whose extremities are pivotally connected to depending arms of a yoke fitting 32 secured on said stem between clamp nuts 33. To the opposite or outer end of the rock shaft 30 is secured a rock lever 34, which, in each instance has pivotal connection with one of a series of up-standing arms 35 with split bosses 36 and associated clamp screws 37 whereby they may be secured, with capacity for relative adjustment, on a common connector in the form of a tubular rod 38 that extends longitudinally over the top of the tank structure 3 as seen to the best advantage in Figs. I, II, and III of the drawings. A terminal fitting 39 with an upwardly off-set extension at the rear end of the rod 38 provides pivotal attachment for a pitman 40 whose opposite end is similarly coupled with one arm 41 of a bell-crank 42. This bell crank 42 is fixed to the top of an operating shaft 43 that extends downwardly into the interior of the storage compartment 7, see Figs. II–III–V–VI and VIII. for attachment of a lever handle 44. When this lever handle 44 is swung outwardly from the position of Fig. II to that of Fig. V, the induced movement of the shaft 43 and clockwise rotation of the bell crank 42 will result in longitudinal rearward shifting of the connector 38, and in turn, simultaneous lifting of the pistons 20 of the emergency valves 14 in opposition to the springs 26 to permit outflow through the pipes or conduits 12. From Fig. V it is to be noted in this connection that the bell crank 42 and pitman 40 jointly form a toggle combination whereby the emergency valves 14 are temporarily held in open position when the tank units 4—5—6 may be drained through use of the faucets of cocks 13.

As a means to effect closure of the emergency valves 14 incidentally with the shutting of the storage compartment door 9, I secure to the latter, a tappet projection 45 that is arranged to engage a wing cam 46 on the operating shaft 43 within the compartment 7 to move said shaft sufficiently to upset the toggle combination between the pitman 40 and bell crank 42, whereupon the valves are simultaneously closed automatically by the springs 26 which are retroactive on the entire system. Consequently, concurrent with the movement of the constituent parts of the system to the normal positions, the lever handle 44 flies inward, the shock attending such action being absorbed by a buffer 47 of rubber or other resilient material (Fig. II) provided for this purpose.

In order to enable operation of the system from the opposite end of the vehicle, preferably from the driver's seat, I make provisions as follows: To the longer arm 48 (not specifically mentioned hereinbefore) of the bell crank lever 42, is secured one end of a flexible rod or cable 49 that is accommodated within the hollow of the tubular connector rod 38, and has attached to its opposite protruding end, a pull handle 50 located within convenient reach in the housing 2. Thus in the event of a fire starting when drawing gasoline and the flames preventing the operator from closing the emergency valves 14 by pushing on lever 44, he may shut off the flow of gasoline by going to the front of the truck and pulling the handle 50 and thereby shifting the bell crank 42 sufficiently so that the toggle relation with the pitman 40 is upset and the system released to the action of the valve springs 26 as already understood.

Having thus described my invention, I claim:

1. In a tank structure composed of a number of separate sub-divisions each provided with a spring influenced emergency valve, and a storage compartment having an access door; the combination of valve operating mechanism including a toggle means, which, when moved in one direction past dead center holds the emergency valves open, and when moved in the reverse direction by a projection on the compartment door permits the automatic closure of said valves under the action of their respective springs.

2. In a tank structure composed of a number of units each provided with a spring influenced emergency valve, and a storage compartment having a fall-down door, the combination of valve control means including a toggle connection functional when moved in one direction to hold the valves open in opposition to spring pressure; a cam and projection means whereby said toggle connection may be tripped in the reverse direction by the fall-down door and effect automatic closure of the valves; and means whereby the toggle connection may be manually shifted to open the valves in opposition to their respective spring pressure.

3. The combination in a tank vehicle of a tank having a storage compartment with a fall-down door; an emergency valve for the tank having spring means whereby it is normally held closed; control means including a toggle connection which, in one position, holds the valve open in opposition to the spring pressure; and a cam and projection means whereby said toggle connection is moved to the reverse position, incidental to closure of the compartment door, and the valve automatically closed by its opposing spring.

4. In a tank structure composed of a number of separate units each provided with a spring influenced emergency valve under control of a common actuator, and a storage compartment having a fall-down door; the combination of toggle means comprising a bell-crank to one arm of which the actuator is co-ordinated by a link; a pivot for the bell-crank having a hand lever whereby the toggle means may be moved in either direction past dead center; a tappet projection on the aforesaid fall-down door; and a co-operative cam on the pivot of the bell-crank whereby said toggle means may be tripped by the fall-down door and all of the emergency valves automatically closed under the action of their respective springs.

In testimony whereof, I have hereunto signed my name at Philadelphia, Pennsylvania, this 27th day of August 1924.

JAMES A. JENSEN.